(12) United States Patent
Lowder

(10) Patent No.: US 10,078,931 B2
(45) Date of Patent: *Sep. 18, 2018

(54) METHOD FOR UTILIZING A WIRELESS CONNECTION TO UNLOCK AN OPENING

(71) Applicant: ASSA ABLOY INC., New Haven, CT (US)

(72) Inventor: Scott B. Lowder, Orange, CT (US)

(73) Assignee: ASSA ABLOY INC., New Haven, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/459,676

(22) Filed: Mar. 15, 2017

(65) Prior Publication Data

US 2017/0278331 A1 Sep. 28, 2017

Related U.S. Application Data

(63) Continuation of application No. 14/902,045, filed as application No. PCT/US2014/071525 on Dec. 19, 2014, now Pat. No. 9,640,004.

(60) Provisional application No. 61/920,116, filed on Dec. 23, 2013.

(51) Int. Cl.
*H04M 1/66* (2006.01)
*G07C 9/00* (2006.01)

(52) U.S. Cl.
CPC ............ *G07C 9/00309* (2013.01); *G07C 2009/00769* (2013.01)

(58) Field of Classification Search
None
See application file for complete search history.

(56) References Cited

U.S. PATENT DOCUMENTS

| 8,447,668 | B2 | 5/2013 | Jentoft |
| 2007/0249288 | A1 | 10/2007 | Moallemi |
| 2008/0133930 | A1 | 6/2008 | Moshir et al. |
| 2009/0249478 | A1 | 10/2009 | Rosener et al. |
| 2011/0215921 | A1 | 9/2011 | Ben Ayed et al. |

(Continued)

FOREIGN PATENT DOCUMENTS

| WO | 2004114227 A1 | 12/2004 |
| WO | WO2012/164385 | 12/2012 |

*Primary Examiner* — Suhail Khan
(74) *Attorney, Agent, or Firm* — DeLio, Peterson & Curcio, LLC; Thomas E. Ciesco

(57) ABSTRACT

A method of operating a lock from a portable remote device includes sending a radio frequency identification signal from the portable remote device to a controller for the lock, and receiving the radio frequency identification signal at the lock controller and identifying the remote device as an authorized user of the lock. The method then includes sending a sound frequency identification signal from the portable remote device to the lock controller, receiving the sound frequency identification signal at the lock controller and identifying the remote device as an authorized user of the lock. The method further includes authorizing operation of the lock in accordance with the radio or sound frequency identification signal from the portable remote device. A system for practicing the method includes a lock controller capable of receiving a radio frequency identification signal and a sound frequency identification signal from the portable remote device.

19 Claims, 6 Drawing Sheets

(56) References Cited

U.S. PATENT DOCUMENTS

| | | |
|---|---|---|
| 2012/0166810 A1 | 6/2012 | Tao et al. |
| 2012/0172018 A1 | 7/2012 | Métivier |
| 2012/0234058 A1 | 9/2012 | Neil et al. |
| 2014/0068751 A1 | 3/2014 | Last |
| 2014/0172953 A1* | 6/2014 | Blanksteen ............. H04W 4/02 709/203 |

* cited by examiner

METHOD FOR UTILIZING A WIRELESS CONNECTION TO UNLOCK AN OPENING

BACKGROUND OF THE INVENTION

1. Field of the Invention

The present invention relates to door locks and in particular to controlling operation of door locks wirelessly by authorized users.

2. Description of Related Art

Multiple factors are driving the adoption of cell phones as a method for opening door locks. These factors include low power and secure wireless technologies like Bluetooth 4.0, universal adoption of Bluetooth by cell phone manufacturers, and widespread consumer use of smart phones.

In the desired operation, a user approaches the front door of the home or apartment, the phone and lock identify that the user is in close proximity and located on the exterior of the door before allowing entry, the lock unlocks and the user simply rotates the actuating lever or knob of the lock and enters the dwelling. Once inside, it is desirable if the lock and phone do not inadvertently unlock the door. All of these steps would ideally occur seamlessly to the user, e.g., the user does not need to interact with the phone or the lock.

Unlike NFC (near field communication) technology, where a phone needs to be presented to a door lock like an RFID credential, Bluetooth technology can function at a range of over 30 m (100 ft.). Although this is convenient for a user because the phone and lock can communicate without user interaction (e.g. the phone can be left in your pocket), this also is a major problem because the phone might unlock a door in an unintended way. One example of an unintended circumstance is when a user pulls into a parking space outside their apartment and the front door unlocks within the building. Considering that it may take 10 minutes to get to the opening, this is an unacceptable condition. Another example of an unintended circumstance is when a user carries the phone around inside their apartment and the front door unlocks in an unexpected way. This might happen if the user moves out of range or resets the phone and the connection is later restored.

Since Bluetooth is a wireless technology, it can pass through walls, and therefore, it is difficult to determine the location of a phone. Recent industry attempts at solutions include attempting to shield the Bluetooth antenna to block signals from inside a building or residence, and attempting to detect differences in Bluetooth signal strength by placing additional wireless sensors inside the building or residence. These attempts at solving the problem require cumbersome installation issues and extra expense.

SUMMARY OF THE INVENTION

Bearing in mind the problems and deficiencies of the prior art, it is therefore an object of the present invention to provide a method and system whereby a lock can be unlocked hands-free and/or automatically by a user carrying a portable remote device.

It is another object of the present invention to provide an improved method and system whereby a lock can determine whether a user's portable remote device is authorized to unlock the lock.

A further object of the invention is to provide an improved method and system whereby a lock can determine whether a user's portable remote device is inside or outside the door before unlocking the door.

It is yet another object of the present invention to provide an improved method and system of automatically unlocking a door which prevents the lock from being unlocked if the user's portable remote device is inside the door.

It is a further object of the present invention to provide an improved method and system of automatically unlocking a lock with a portable remote device without installing additional devices beyond the lock controller.

Another object of the invention is to provide a method and system of using a portable remote device to unlock a door which is unobtrusive to the user.

Still other objects and advantages of the invention will in part be obvious and will in part be apparent from the specification.

The above and other objects, which will be apparent to those skilled in the art, are achieved in the present invention which is directed to a method of operating a lock from a portable remote device comprising sending a radio frequency identification signal from the portable remote device to a controller for the lock, and receiving the radio frequency identification signal at the lock controller and identifying the remote device as an authorized user of the lock. The method then includes sending a sound frequency identification signal from the portable remote device to the lock controller, receiving the sound frequency identification signal at the lock controller and identifying the remote device as an authorized user of the lock. The method further includes authorizing operation of the lock in accordance with the radio or sound frequency identification signal from the portable remote device.

The portable remote device may be a mobile telephone and the radio frequency identification signal may be a Bluetooth signal. The portable remote device may include a speaker, and the method may include sending the sound frequency identification signal from the speaker. The lock may control access to an area secured by a physical barrier, and the method may determine a side of the barrier from which the sound frequency identification signal is sent from the portable remote device.

The method may further include authorizing operation of the lock only if the sound frequency identification signal is sent from the portable remote device from a desired side of the barrier. The method may include a sound frequency detection device on each side of the barrier operatively connected to the controller, and include attempting to detect the sound frequency identification signal with both sound frequency detection devices to determine the side of the barrier from which the sound frequency identification signal is sent. Operation of the lock may be authorized only if the sound frequency identification signal is first detected from a sound frequency detection device on the desired side of the barrier.

The radio frequency identification signal may be initially sent from the portable remote device and received by the controller at a first distance from the lock, and the method may further include, after initially sending the radio frequency identification signal, moving the remote device toward the lock, wherein the sound frequency identification signal from the portable remote device is received by the controller at a second distance from the lock closer than the first distance. The lock may control access to an area secured by a door, and the method may further include operating the lock to unlock the door.

The method may further include deactivating operation of the lock in accordance with the radio or sound frequency identification signal from the portable remote device after the door is unlocked. The method may include deactivating operation of the lock in accordance with the radio or sound frequency identification signal unless the portable remote device is moving toward the lock.

A sound frequency detection device may be in the vicinity of the door and operatively connected to the controller, and the sound frequency detection device may receive the sound frequency identification signal from the portable remote device. The sound frequency identification signal may be provided in a frequency above 20,000 Hz or inaudible to most humans.

The sound frequency identification signal may be received at the lock controller at a time after the radio frequency identification signal is received at the lock controller. The sound frequency identification signal may be received at the lock controller from the portable remote device at a distance closer than the radio frequency identification signal is received at the lock controller.

After receiving the radio frequency identification signal and identifying the remote device as an authorized user of the lock, the lock controller may send a radio frequency signal to the remote device specifying the sound frequency identification signal to be sent from the portable remote device, and the portable remote device may subsequently send the specified sound frequency identification signal to the lock controller. The sound frequency identification signal may be specified as to frequency, duration and/or amplitude. The radio frequency identification signal and sound frequency identification signal may be digitally coded.

Operation of the lock may be authorized only if both the radio frequency identification signal and the sound frequency identification signal indicate that the portable remote device is an authorized user. A sound frequency identification signal is sent from the portable remote device to the lock controller only if the portable remote device is moving.

The method may further include additional validation by radio frequency identification signal and/or sound frequency identification signal before authorizing operation of the lock.

In a related aspect, the present invention is directed to a method of operating a lock from a portable remote device comprising initially providing a lock controller having an antenna for receiving radio frequency signals, a microphone for receiving sound frequency signals, a microprocessor for processing a radio frequency identification signal received by the antenna and a sound frequency identification signal received by the microphone to determine if the signals emanate from an authorized user of the lock, and a device driver controllable by the microprocessor for operating the lock. The method then includes sending a radio frequency identification signal from the portable remote device to the lock controller, and receiving the radio frequency identification signal at the lock controller and using the microprocessor to determine whether the remote device is an authorized user of the lock. If the remote device is identified as an authorized user of the lock, the method includes sending a radio frequency signal from the lock controller to the remote device specifying a sound frequency identification signal to be sent from the portable remote device. The method includes subsequently sending the specified sound frequency identification signal from the portable remote device to the lock controller, and receiving the sound frequency identification signal at the lock controller and using the microprocessor to determine whether the remote device is an authorized user of the lock. If the remote device is identified as an authorized user of the lock from both the radio frequency identification signal and the sound frequency identification signal, the method includes sending an authorization signal from the processor to the device driver authorizing unlocking of the lock and, after unlocking the door, deactivating operation of the lock in accordance with the radio or sound frequency identification signal.

In another aspect, the present invention is directed to a system for operating a lock from a portable remote device comprising a lock controller capable of receiving a radio frequency identification signal and a sound frequency identification signal from the portable remote device. The lock controller may be capable of determining whether the radio frequency identification signal and the sound frequency identification signal identify the remote device as an authorized user of the lock. The system includes a device driver for operating the lock upon determination by the lock controller that the radio frequency identification signal and the sound frequency identification signal identify the remote device as an authorized user of the lock. The radio frequency identification signal may be transmitted via a Bluetooth signal.

The lock may control access to an area secured by a physical barrier, and the lock controller may be capable of determining a side of the barrier from which the sound frequency identification signal is sent from the moveable remote device. The lock controller may authorize operation of the lock only if the sound frequency identification signal is sent from the moveable remote device from a desired side of the barrier.

The system may further include a sound frequency detection device on each side of the barrier operatively connected to the controller, wherein the system may attempt to detect the sound frequency identification signal with both sound frequency detection devices to determine the side of the barrier from which the sound frequency identification signal is sent.

The system may further include a sound frequency detection device operatively connected to the controller, with the sound frequency detection device receiving the sound frequency identification signal from the portable remote device. The sound frequency identification signal may be provided in a frequency above 20,000 Hz or inaudible to most humans.

The system may further include a lock operated by the device driver to unlock the door. The system may also include an antenna for receiving the radio frequency identification signal and a microphone for receiving the sound frequency identification signal.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
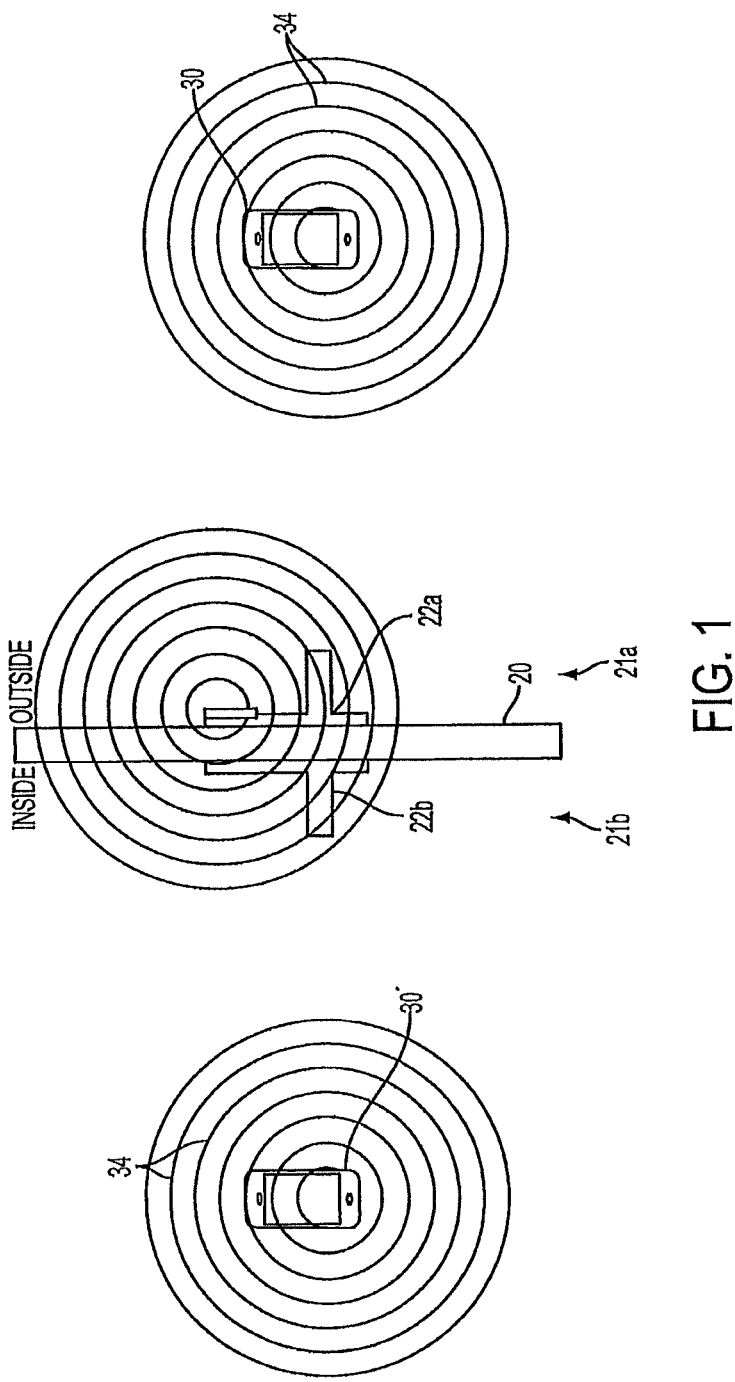
FIG. 1 is a side schematic view of a door lock of the present invention and portable remote devices on the outside and inside of the door.

In describing the preferred embodiment of the present invention, reference will be made herein to FIGS. 1-6 of the drawings in which like numerals refer to like features of the invention.

The embodiments of the present invention described herein utilize a combination of radio frequency wireless communication, e.g., Bluetooth data, and sound frequency communication to authenticate the user carrying a portable remote device, e.g., a mobile of cell phone, and confirm its close proximity to the outside of a door containing a lock. The present invention employs such radio frequency and non-radio frequency wireless communication to control and/or operate one or more locks. As used herein, the term wireless refers to the transfer of a signal or information between two or more points that are not connected by an electrical conductor. Wireless communication may include the electromagnetic frequencies and electromagnetic wireless technologies employing radio, magnetic, or other electric fields and electromagnetic radiation, or the use of sound.

The radio frequency wireless communication employed may be any desired frequency in the radio frequency spectrum. In the embodiments described herein, Bluetooth wireless technology may be employed, which is usually available in mobile phones and other devices that may be carried on the person of a user. Communication using Bluetooth wireless technology (v4.0) can be used to send and exchange data over short distances using short-wavelength UHF radio waves in the ISM band from 2.4 to 2.485 GHz between fixed and mobile devices. The effective range varies due to various conditions, but may extend through walls of buildings, and over distances ranging up to 100 m or more. Other communication technologies may be employed, such as ZigBee wireless technology (IEEE 802.15.4) operating at about 915 MHz in the U.S. and Australia, 868 MHz in Europe, 784 MHz in China and 2.4 GHz in other jurisdictions worldwide; Z-Wave wireless technology operating at about 900 MHz; and Wi-Fi wireless technology (IEEE802.11) operating at about 2.4 GHz and 5 GHz. Wi-Fi generally requires more power than Bluetooth and the other wireless technologies.

The sound or audio frequency employed may be a frequency that may or may not be audible to the average human. Audible frequencies are typically in the range of about 20 to 20,000 Hz. Sound frequencies below 20 Hz are generally felt rather than heard, assuming the amplitude of the vibration is great enough. Sound frequencies above 20 kHz are sometimes sensed by younger people, but may be generally inaudible to humans. A sound frequency outside the normal human audible range, e.g., in the super- or ultra-sonic range above 20 kHz, would enable a sound frequency identification signal to be sent and received without disturbing the user or nearby people.

The embodiment of the portable remote device is mobile telephone with Bluetooth communication and connection capability, but any device can be utilized that incorporates a radio frequency wireless antenna, a speaker, a microprocessor to execute the various functions, and a battery to power the device. For example, a small fob with these components may be used to perform the same operation.

As shown in FIG. 1, door 20 includes lock 22, which controls access to an area secured by walls or some other type of physical barrier. The present invention may be typically utilized for entrances such as a door 20 located on the exterior of a building or at individual residences within a building. Entrance doors are typically thermally and acoustically insulated to improve the energy efficiency and living environment of the space in the inside or indoor area 21b. Entrance doors can be constructed with a variety of materials but their basic function is common to provide security, privacy (including acoustic), energy efficiency, and insulation (again including acoustic) from environments on the exterior 21a. Door 20 includes a lock 22 having an external escutcheon or housing portion 22a having an exterior actuator handle 24a and an antenna 42 and an interior escutcheon or housing portion 22b having an interior actuator handle 24b. In use, the portable remote device may be located on the exterior region 21a of the door as mobile phone 30 or in the interior region 21b of the door as mobile phone 30'. In each instance, the mobile phone 30, 30' transmits radio frequency signals 34 from a distance of directly adjacent to the door lock antenna 42 to up to 30 to 100 m from the antenna, to permit the phone and lock to communicate wirelessly, but without providing a means for the lock to know the proximity and location of the phone on the inside or outside of the door, or even on a floor above or below the door.

Figure 2:
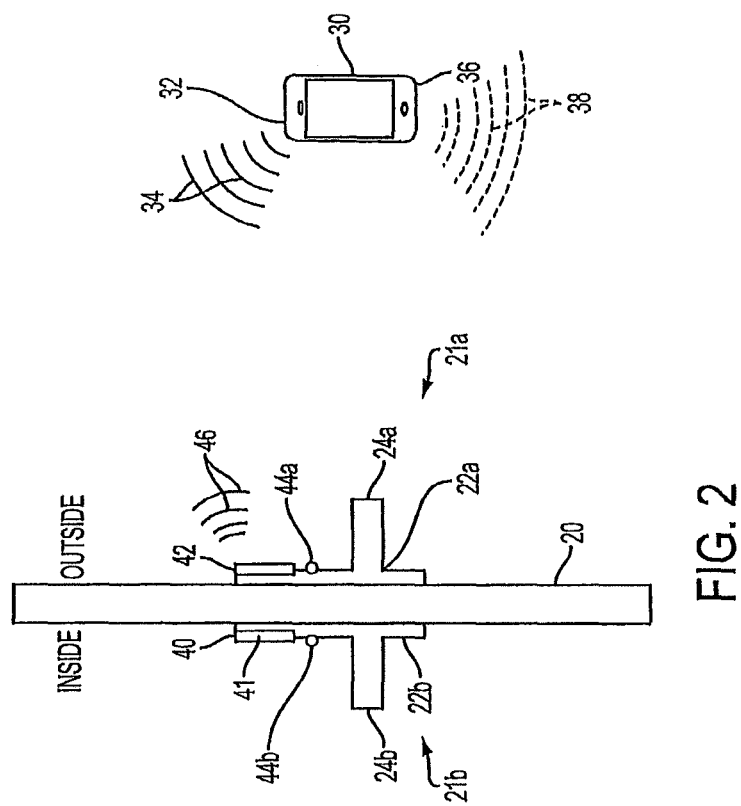
FIG. 2 is a side schematic view of a door lock and lock controller of the present invention in communication with a portable remote device on the outside of the door.
Figure 3:
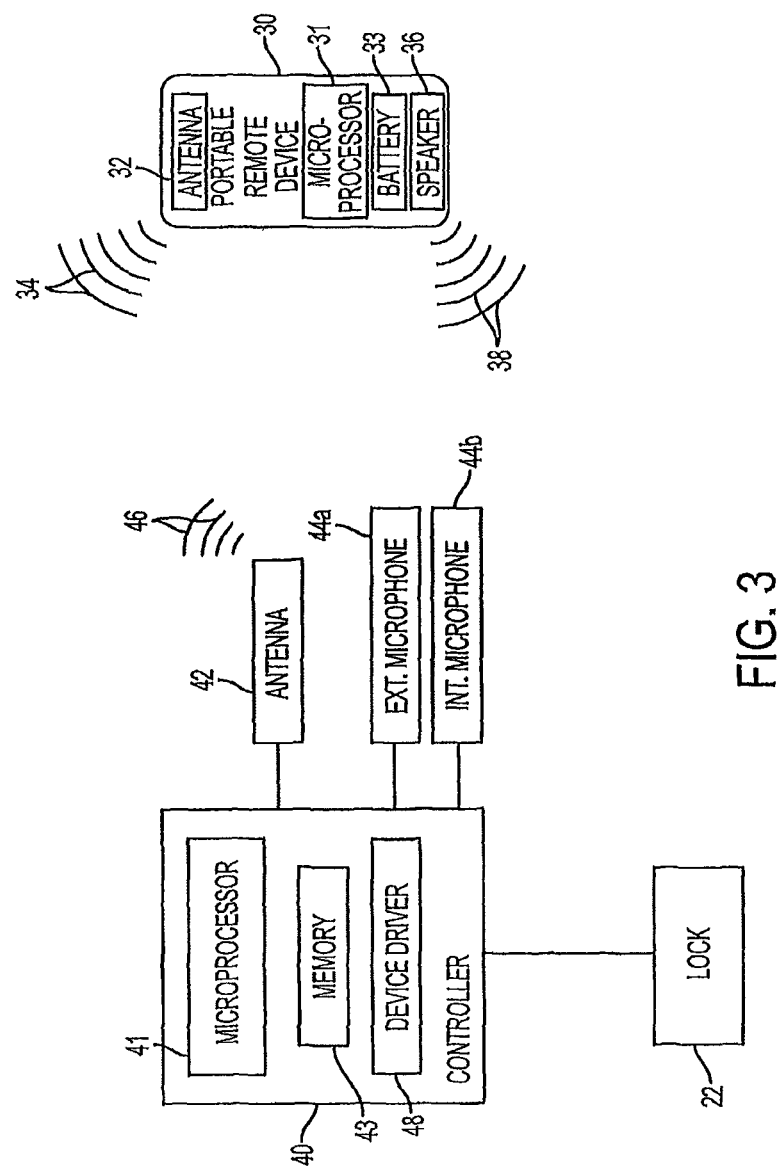
FIG. 3 is a schematic of the door lock, lock controller and portable remote device of the present invention.

To enable lock 22 to establish the proximity and location of the portable remote device before unlocking the door and authorizing access by the phone 30 user, a non-radio frequency signal is sent between the phone 30 and lock 20. The door lock may be equipped with one or more sound detection devices such as a microphone on the exterior and/or interior escutcheon, for example, on the same door surface as the outside and/or inside lever. In FIGS. 2 and 3, there is shown lock 22 with controller 40 containing microprocessor 41 connected to optional microphone 44b mounted on the inside lock escutcheon 22b (FIG. 2). Memory 43 (FIG. 3) in controller 40 may store authorized user codes or other identifying indicia. Device driver 48 (FIG. 3) operates lock 22 between locked and unlocked states. The controller 40 is also operably connected to antenna 42 and microphone 44a on the exterior lock escutcheon 24a (FIG. 2). Portable remote device mobile phone 30 includes microprocessor 31, battery 33 to power the device, a radio frequency antenna 32 capable of sending and receiving radio frequency signals 34 and a speaker 36 that is capable of sending sound frequency signals. Both the door lock 22 and phone or fob device 30 are Bluetooth wireless radio frequency communication capable.

In use in one embodiment of FIG. 2, the user approaches the door 22 with mobile phone 30 from the outside area 21a, so that the phone and lock are within wireless range of each other, which may be greater than 30 m (100 ft.) After the Bluetooth connection is made, whereby lock controller 40 recognizes mobile phone 30 as an authorized user of lock 22 and so notifies phone 30 via radio frequency signals identifying each other, the phone is instructed to begin to ping audibly at a low volume, emitting the sound frequency identification signal 38. As the user and phone 30 move toward and approach door 20, exterior microphone 44a picks up the ping signal 38 and sends it to controller 40 of the lock, which determines that phone 30 is an authorized user of lock 22 and unlocks door 22. As used herein, the term ping refers to any sound frequency signal, whether analog or digital, and whether containing a code or not.

In another embodiment of FIG. 2, phone 30 again approaches door 22 from the outside area 21a so that phone 30 and lock 22 with antenna 42 are within Bluetooth wireless range. Lock 22 and controller 40 utilize exterior microphone 44a to monitor the local environment 21a outside the door. Once phone 30 sends the identification signal and it is received and authenticated by lock controller 40, the lock controller determines or has already specified a sound frequency identification signal to be sent from the portable remote device, which may include sound frequency, duration and/or amplitude for the phone ping to create a unique identification signal. This audio frequency may be of a frequency higher than 20 kHz, so that it is inaudible and therefore unobtrusive to an adult human user. Lock controller 40 sends to the phone via the Bluetooth wireless communication the specification of the sound frequency identification signal to be sent back. Upon receipt of this sound identification information, the phone subsequently sends the specified sound frequency identification signal or ping to the lock controller at the requested frequency, duration, and amplitude. The phone may delay sending the identifying ping until the user has stopped moving, for example by monitoring one or more accelerometers within the phone. If the user is outside the door, the external microphone 44a would detect the phone ping signal 38 first, before internal microphone 44b, to confirm that the user and phone 30 are on the exterior side of door 20. The controller may also check the relative sound levels to confirm that the inside microphone 44b detected sound level is of lower amplitude and sound volume than the outside microphone 44a detected sound level. In the event that the phone ping is detected first by inside microphone 44b, or the sound volume detected is higher on the inside microphone than the outside microphone, the unlocking sequence is aborted and no authorization or door unlocking is made, since the user is already inside the door.

If the user and phone 30 are confirmed to be outside the door, an optional further and final validation may occur between the lock and the phone, wherein the lock controller communicates digitally via Bluetooth to the phone to request a further sound ping, and the phone communicates digitally via sound to the lock with the requested ping. The radio and sound identification signals between the lock controller 40 and the phone 30 may be analog or digital communication signals. Once the lock authenticates the user via radio and/or sound frequency communication, the controller then activates a device driver for operating the lock and unlock the door and permit entry. Once the user opens the door and enters the inside area 21b, after the door closes the controller may optionally activate the device driver to lock the door.

The methods of authentication and authorization for unlocking the door may use one or more of the steps and signals of the embodiments above, between the simplest and advanced examples described. Since a digital wireless link exists between the lock and phone at all times during this authentication process, the sound or audio response can be dynamically altered in real time to optimize the likelihood of a successful authentication. For example, the amplitude, frequency, duration, and other sound parameters can be continuously modulated. It may also be desirable to repeat a digital key through modulation as the ping for highest security.

Since the phone can be stored in a pocket, purse, bag, or other enclosure on the user, the sound frequency ping amplitude may be muted by the enclosure. An authentication configuration step may be employed between phone 30 carried by the user and lock controller 40 to determine the optimal amplitude or frequency of the sound to be detected by the external microphone 44a. This step would be performed upon setup or if initiated by the user to improve performance.

To minimize user dissatisfaction with this authentication process, the phone may only initiate the automatic authentication once, upon entering wireless range with the lock. If the automatic authentication is aborted, the user can manually restart the process. Also, phone pinging inside a residence at any time needs to be minimized. Since the phone ping may be set to be inaudible to adult ears, the lock controller may send a signal to the phone to immediately stop the pinging if it is detected by the inside microphone 44b, and determined to be inside the door 20. The phone ping may also not be initiated by the controller or the phone if the phone is not in motion, for example, laying on a table inside the door.

Figure 4:
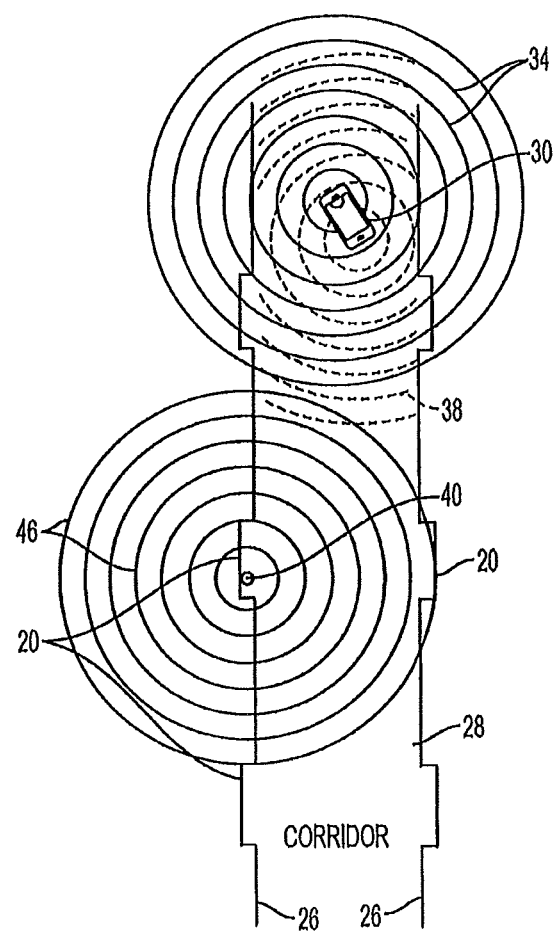
FIG. 4 is a top plan schematic view of a portable remote device approaching the lock controller of the present invention from outside the door.
Figure 5:
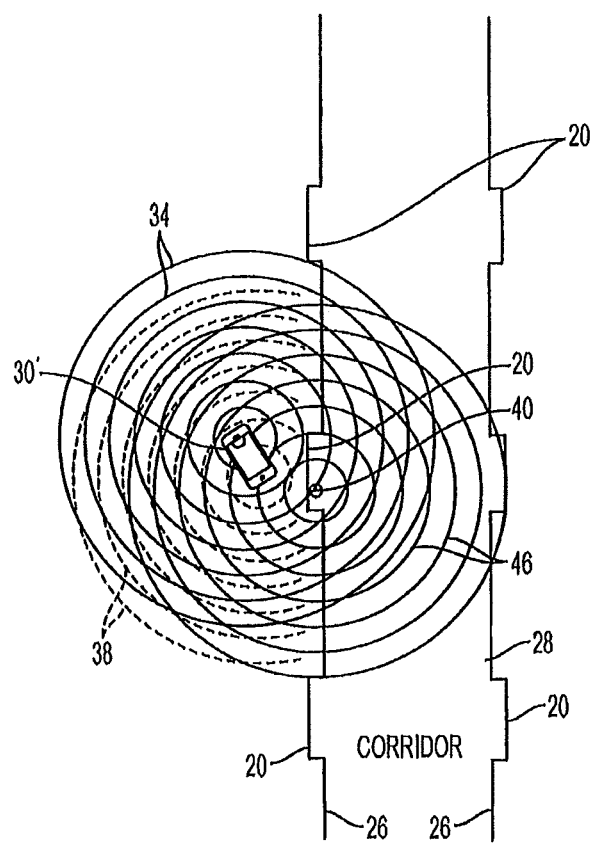
FIG. 5 is a top plan schematic view of a portable remote device inside the door having the lock controller of the present invention.
Figure 6:
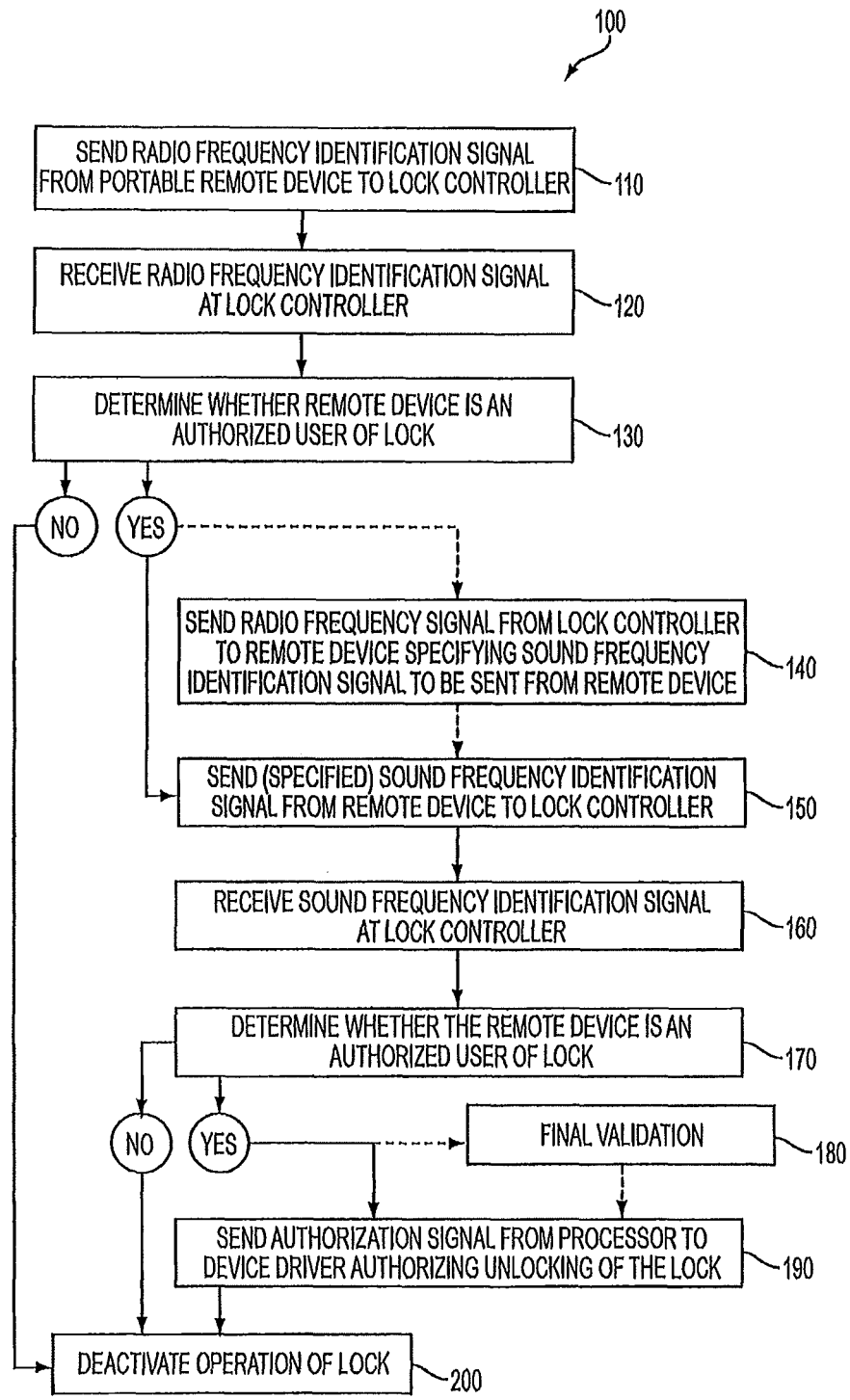
FIG. 6 is a flow chart block diagram showing modes of operation of the lock controller and portable remote device of the present invention.

Examples of the ability of the system to distinguish between phone location outside and inside of the door are shown in FIGS. 4 and 5. In FIG. 4, door lock controller 40 is wirelessly communicating with an approaching phone 30 in the corridor 28 formed by doors 20 and walls 26. The phone 30 is located in public corridor 28 outside of the user's apartment. As depicted, the wireless signal can easily penetrate the corridor walls 26 and doors 20 but the audio signals cannot. In such case, either the external microphone alone, or the combination of external and internal microphones, as described above, receives the sound frequency identification signal and locates the phone 30 as being outside door 20 and in a position to control operation of the lock. In FIG. 5, door lock controller 40 is wirelessly communicating with a phone 30' located within the walls 26 of an apartment and inside door 20. As depicted, the wireless signal can easily penetrate the corridor walls and doors but the audio signals cannot. In this case, either the external microphone alone does not receive the sound frequency identification signal, or the combination of external and internal microphones locates the phone 30' as being inside door 20. This prevents the door from unlocking, even though a radio frequency data connection has been established between the lock controller and phone.

The controller 40 further may include a device driver 48 (FIG. 3) operable and controllable by the microprocessor to operate the lock, either to unlock or lock it. The device driver may be a circuit, a computer program, hardware, or any combination, that operates or controls the lock. The device driver may provide a software interface to the lock hardware devices, enabling operating systems and other computer programs to access hardware functions without needing to know precise details of the hardware being used. A driver typically communicates with the device through the computer bus or communications subsystem to which the hardware connects. When a calling program invokes a routine in the driver, the driver issues commands to the device. Once the device sends data back to the driver, the driver may invoke routines in the original calling program.

The operation 100 of the lock controller and system described above is depicted in FIG. 6. The portable remote device sends a radio frequency identification signal to the lock controller 110, which signal is received at the lock controller 120. The signal may be analog or digital, and may include code or other indicia, which may be encrypted, to identify the user and any other desired information. The controller then uses its microprocessor to determine whether the remote device is an authorized user of the lock by comparing the identification signal to authorized user signals in its memory. If the signal does not indicate that the user's remote device is authorized to use the lock, the lock operation is deactivated 200. If the remote device is identified as an authorized user of the lock, the lock controller may optionally send a radio frequency signal to the remote device specifying a sound frequency identification signal to be sent from the portable remote device 140. The portable remote device then sends a sound frequency identification signal to the lock controller 150, which signal is the specified signal if requested by the controller.

The lock controller receives the sound frequency identification signal 160 using either one or both of the exterior and/or interior microphones, as described above. Using its microprocessor, the lock controller determines whether the remote device is an authorized user of the lock 170. If the signal does not indicate that the user's remote device is authorized to use the lock, the lock operation is deactivated 200. If the remote device is identified as an authorized user of the lock, the processor sends an authorization signal to the device driver authorizing unlocking of the lock 190. Optionally, before authorizing the door unlocking, a final validation occurs between the lock and the phone 180, where the lock controller sends a request to the phone for a further sound ping, and the phone sends the requested sound ping to the lock controller. After unlocking the door, the controller deactivates operation of the lock 190 and/or send other commands to the system, e.g., to the device driver to re-lock the door after it is closed.

An embodiment of the door lock controller 40 of the present invention may take the form of an entirely hardware embodiment, or an embodiment that uses software (including firmware, resident software, micro-code, etc.). Furthermore, an embodiment may take the form of a computer program product on a tangible computer-usable storage medium having computer-usable program code embodied in the medium. A memory device 43 or memory portion of a processor 41 as shown in FIG. 3 can form the medium. Computer program code or firmware to carry out an embodiment of the present disclosure could also reside on optical or magnetic storage media, especially while being transported or stored prior to or incident to the loading of the computer program code or firmware into a door closer. This computer program code or firmware can be loaded by connecting a computer system or external controller to the programming interface.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

Accordingly, the present invention provides an improved method and system by which a lock may be unlocked hands-free and/or automatically by a user carrying a portable remote device. The lock and lock controller can determine whether a user's portable remote device is authorized to unlock the lock, and can determine whether the remote device is inside or outside the door before unlocking the door. The method and system prevent the lock from being unlocked if the portable remote device is inside the door. The method and system may be used without installing additional devices beyond the lock controller, and is unobtrusive to the user.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of operating a lock from a portable remote device, the lock controlling access to an area secured by a physical barrier, comprising:
sending a radio frequency identification signal from the portable remote device to a controller for the lock;
receiving the radio frequency identification signal at the lock controller and identifying the remote device as an authorized user of the lock;
sending a sound frequency identification signal from the portable remote device to the lock controller;
receiving the sound frequency identification signal from the portable remote device at the lock controller;
determining a side of the barrier from which the sound frequency identification signal is sent from the portable remote device;
identifying the portable remote device as an authorized user of the lock; and
authorizing operation of the lock in accordance with the radio or sound frequency identification signal from the portable remote device and only if the sound frequency identification signal is sent from the portable remote device from a desired side of the barrier.

2. The method of claim 1 wherein the portable remote device is a mobile telephone and the radio frequency identification signal is a Bluetooth signal.

3. The method of claim 1 wherein the radio frequency identification signal is initially sent from the portable remote device and received by the controller at a first distance from the lock, and further including, after initially sending the radio frequency identification signal, moving the remote device toward the lock, and wherein the sound frequency identification signal from the portable remote device is received by the controller at a second distance from the lock closer than the first distance.

4. The method of claim 1 wherein the sound frequency identification signal is provided in a frequency above 20,000 Hz or inaudible to most humans.

5. The method of claim 1 wherein the sound frequency identification signal is received at the lock controller at a time after the radio frequency identification signal is received at the lock controller.

6. The method of claim 1 wherein the sound frequency identification signal is received at the lock controller from the portable remote device at a distance closer than the radio frequency identification signal is received at the lock controller.

7. The method of claim 1 wherein, after receiving the radio frequency identification signal and identifying the remote device as an authorized user of the lock, the lock controller sends a radio frequency signal to the remote device specifying the sound frequency identification signal to be sent from the portable remote device, and wherein the portable remote device subsequently sends the specified sound frequency identification signal to the lock controller.

8. The method of claim 1 wherein the sound frequency identification signal is specified as to frequency, duration and/or amplitude.

9. The method of claim 1 wherein the radio frequency identification signal and sound frequency identification signal are digitally coded.

10. The method of claim 1 further including additional validation by radio frequency identification signal and/or sound frequency identification signal before authorizing operation of the lock.

11. A method of operating a lock from a portable remote device, the lock controlling access to an area secured by a physical barrier, comprising:
providing a sound frequency detection device on each side of the barrier operatively connected to a controller for the lock;
sending a radio frequency identification signal from the portable remote device to the lock controller;
receiving the radio frequency identification signal at the lock controller and identifying the remote device as an authorized user of the lock;

sending a sound frequency identification signal from the portable remote device to the lock controller;
receiving the sound frequency identification signal from the portable remote device at the lock controller;
using the sound frequency detection devices on both sides of the barrier, determining a side of the barrier from which the sound frequency identification signal is sent from the portable remote device;
identifying the portable remote device as an authorized user of the lock; and
authorizing operation of the lock in accordance with the radio or sound frequency identification signal from the portable remote device.

12. The method of claim 11 wherein operation of the lock is authorized only if the sound frequency identification signal is first detected from a sound frequency detection device on the desired side of the barrier.

13. The method of claim 11 wherein the radio frequency identification signal is initially sent from the portable remote device and received by the controller at a first distance from the lock, and further including, after initially sending the radio frequency identification signal, moving the remote device toward the lock, and wherein the sound frequency identification signal from the portable remote device is received by the controller at a second distance from the lock closer than the first distance.

14. A lock controller for operating a lock for a door from a portable remote device comprising:
an antenna for receiving a radio frequency identification signal;
a microphone for receiving a sound frequency identification signal from the portable remote device;
a microprocessor for processing a radio frequency identification signal received by the antenna and a sound frequency identification signal received by the microphone to determine whether the radio frequency identification signal and the sound frequency identification signal identify the remote device as an authorized user of the lock; and
a device driver controllable by the microprocessor for operating the lock upon determination by the lock controller that the radio frequency identification signal and the sound frequency identification signal identify the remote device as an authorized user of the lock,
the lock controller capable of and adapted to receive a radio frequency identification signal, use the microprocessor to determine whether the remote device is an authorized user of the lock and, if the remote device is identified as an authorized user of the lock, send a radio frequency signal from the lock controller to the remote device specifying a frequency, duration and/or amplitude of the sound frequency identification signal to be sent from the portable remote device;
the lock controller further capable of and adapted to receive the sound frequency identification signal from the portable remote device and use the microprocessor to determine whether the remote device is an authorized user of the lock and, if the remote device is identified as an authorized user of the lock from both the radio frequency identification signal and the specified frequency, duration and/or amplitude of the sound frequency identification signal, send an authorization signal from the processor to the device driver authorizing unlocking of the lock.

15. The lock controller of claim 14 wherein the radio frequency identification signal is transmitted via a Bluetooth signal.

16. The lock controller of claim 14 wherein the lock controls access to an area secured by a physical barrier, and the lock controller is capable of determining a side of the barrier from which the sound frequency identification signal is sent from the portable remote device.

17. The lock controller of claim 16 wherein the lock controller authorizes operation of the lock only if the sound frequency identification signal is sent from the portable remote device from a desired side of the barrier.

18. The lock controller of claim 16 further including a sound frequency detection device on each side of the barrier operatively connected to the controller, and wherein the lock controller is capable of detecting the sound frequency identification signal with both sound frequency detection devices to determine the side of the barrier from which the sound frequency identification signal is sent.

19. A lock controller for operating a lock for a door from a portable remote device, the lock controlling access to an area secured by a physical barrier, comprising:
an antenna for receiving a radio frequency identification signal;
a microphone on each side of the barrier for receiving a sound frequency identification signal from the portable remote device;
a microprocessor for processing a radio frequency identification signal received by the antenna and a sound frequency identification signal received by the microphone to determine whether the radio frequency identification signal and the sound frequency identification signal identify the remote device as an authorized user of the lock; and
a device driver controllable by the microprocessor for operating the lock upon determination by the lock controller that the radio frequency identification signal and the sound frequency identification signal identify the remote device as an authorized user of the lock,
the lock controller capable of and adapted to receive a radio frequency identification signal, use the microprocessor to determine whether the remote device is an authorized user of the lock and, if the remote device is identified as an authorized user of the lock, send a radio frequency signal from the lock controller to the remote device specifying the sound frequency identification signal to be sent from the portable remote device;
the lock controller further capable of and adapted to receive the sound frequency identification signal from the portable remote device and use the microprocessor to determine a side of the barrier from which the sound frequency identification signal is sent from the portable remote device and whether the remote device is an authorized user of the lock, and, if the portable remote device is identified as an authorized user of the lock from both the radio frequency identification signal and the sound frequency identification signal and if the sound frequency identification signal is sent from the portable remote device from a desired side of the barrier, send an authorization signal from the processor to the device driver authorizing unlocking of the lock.

* * * * *